(12) United States Patent
Kondo

(10) Patent No.: US 12,198,740 B1
(45) Date of Patent: Jan. 14, 2025

(54) MAGNETIC DISK DEVICE AND METHOD OF DETECTING FLYING HEIGHT OF MAGNETIC HEAD

(71) Applicants: Kabushiki Kaisha Toshiba, Tokyo (JP); Toshiba Electronic Devices & Storage Corporation, Tokyo (JP)

(72) Inventor: Masayuki Kondo, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/421,841

(22) Filed: Jan. 24, 2024

(30) Foreign Application Priority Data

Sep. 21, 2023 (JP) .................................. 2023-155489

(51) Int. Cl.
*G11B 5/58* (2006.01)
*G11B 5/60* (2006.01)

(52) U.S. Cl.
CPC .................................... *G11B 5/607* (2013.01)

(58) Field of Classification Search
CPC ......... G11B 5/607; G11B 33/144; G11B 5/54; G11B 33/14; G11B 33/1406; G11B 5/58; G11B 5/5534; G11B 5/56; G11B 5/6029; G11B 2005/0021; G11B 5/09

USPC .......................................................... 360/75
See application file for complete search history.

(56) References Cited

U.S. PATENT DOCUMENTS

| 8,254,051 | B2 | 8/2012 | Kuramoto |
| 9,001,451 | B1 | 4/2015 | Martin et al. |
| 9,502,063 | B1 | 11/2016 | Zhu et al. |
| 10,410,662 | B1 * | 9/2019 | Liu .......................... G11B 5/607 |
| 10,847,180 | B1 | 11/2020 | Martin |
| 2011/0317302 | A1 | 12/2011 | Sakai et al. |
| 2012/0229928 | A1 | 9/2012 | Sakai |

FOREIGN PATENT DOCUMENTS

| JP | 2004-303318 A | 10/2004 |
| JP | 2008-217841 A | 9/2008 |
| JP | 2012-09110 A | 1/2012 |
| JP | 2012-190519 A | 10/2012 |

* cited by examiner

*Primary Examiner* — Nabil Z Hindi
(74) *Attorney, Agent, or Firm* — Maier & Maier, PLLC

(57) ABSTRACT

According to one embodiment, a magnetic disk device comprising a magnetic head expanding to the magnetic disk side with the generated heat of a heater, a flying height measurement unit measuring a flying height of the magnetic head, based on a read signal of the magnetic head for data for measuring flying height written to the magnetic disk, and a controller. The controller detects variation of a measurement value of the flying height measurement unit, based on change of "correspondence between a change amount of the supply power and a measurement value of the flying height measurement unit".

9 Claims, 15 Drawing Sheets

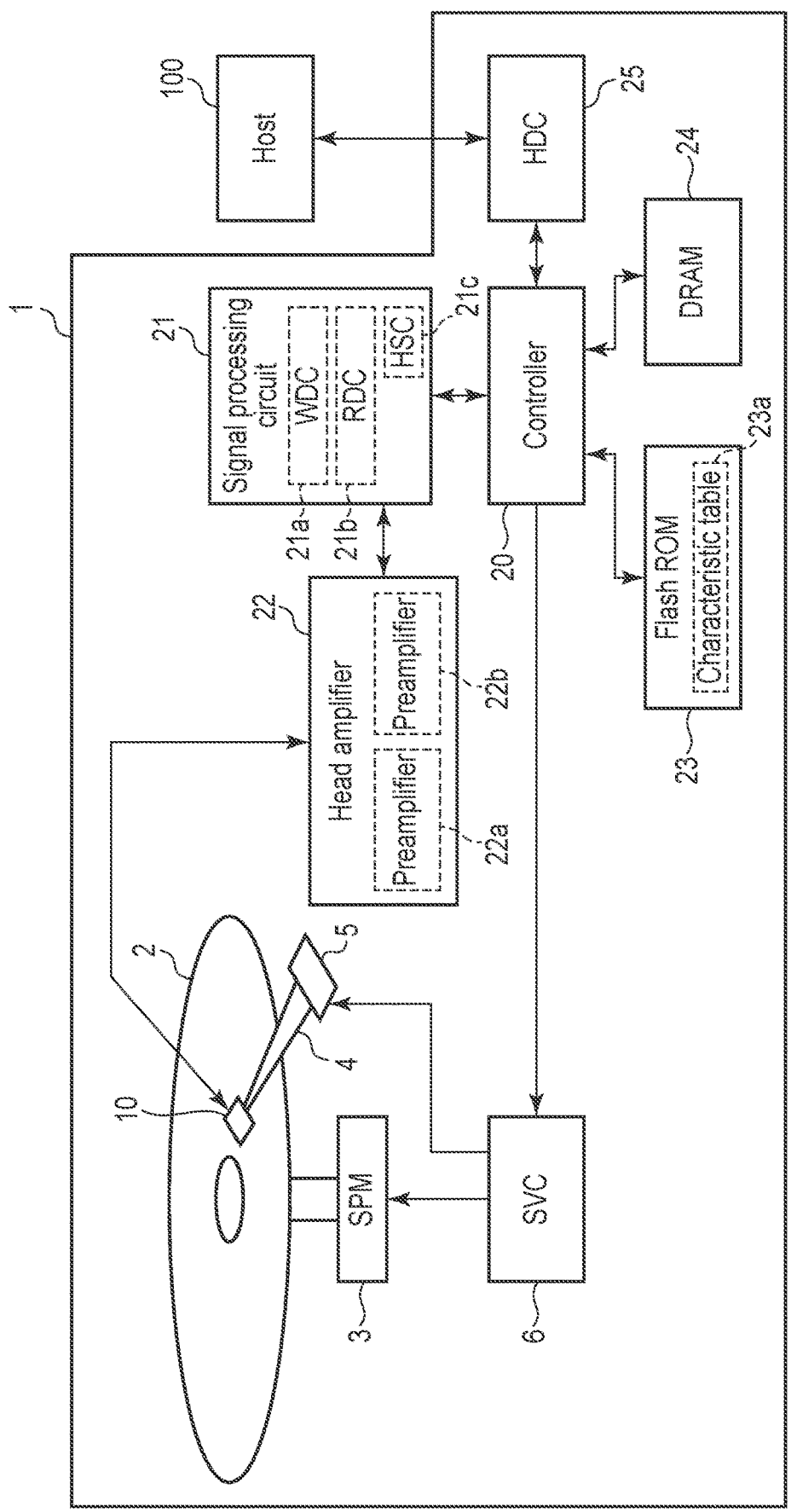
F I G. 1

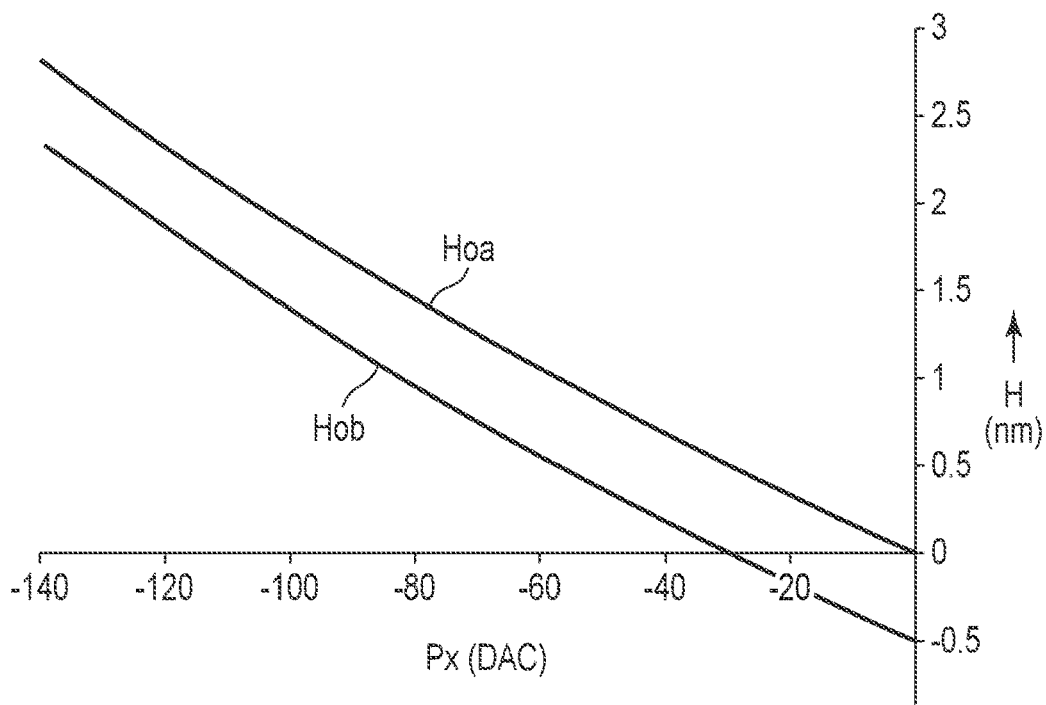
F I G. 18
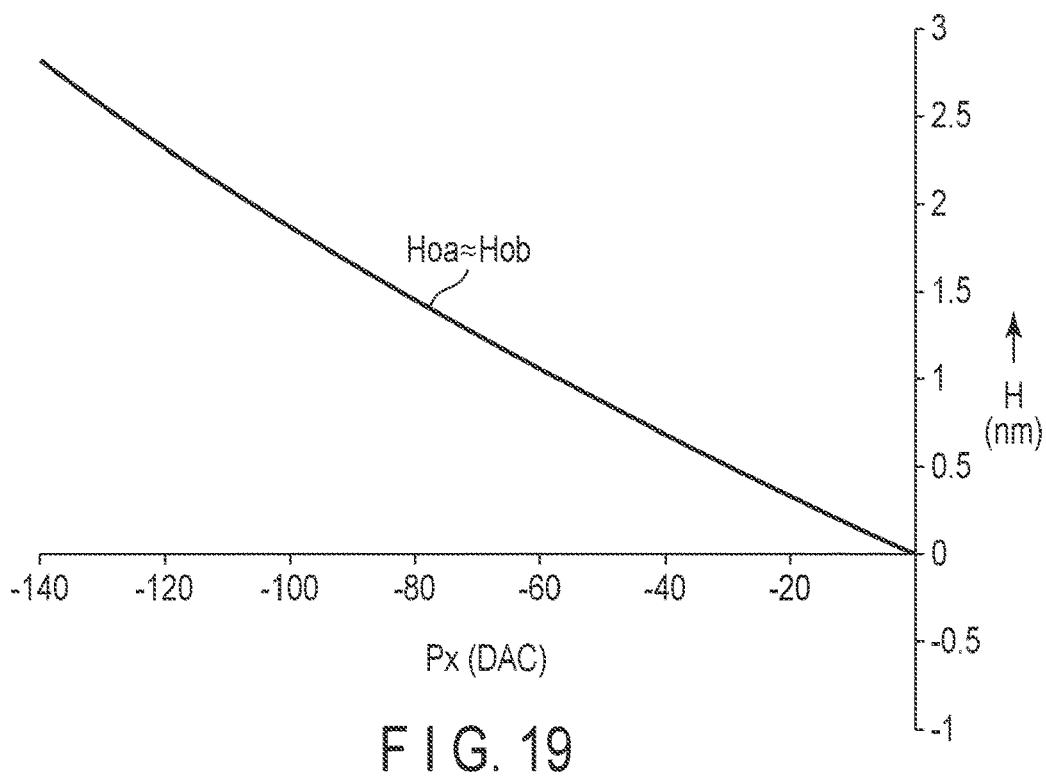
F I G. 19

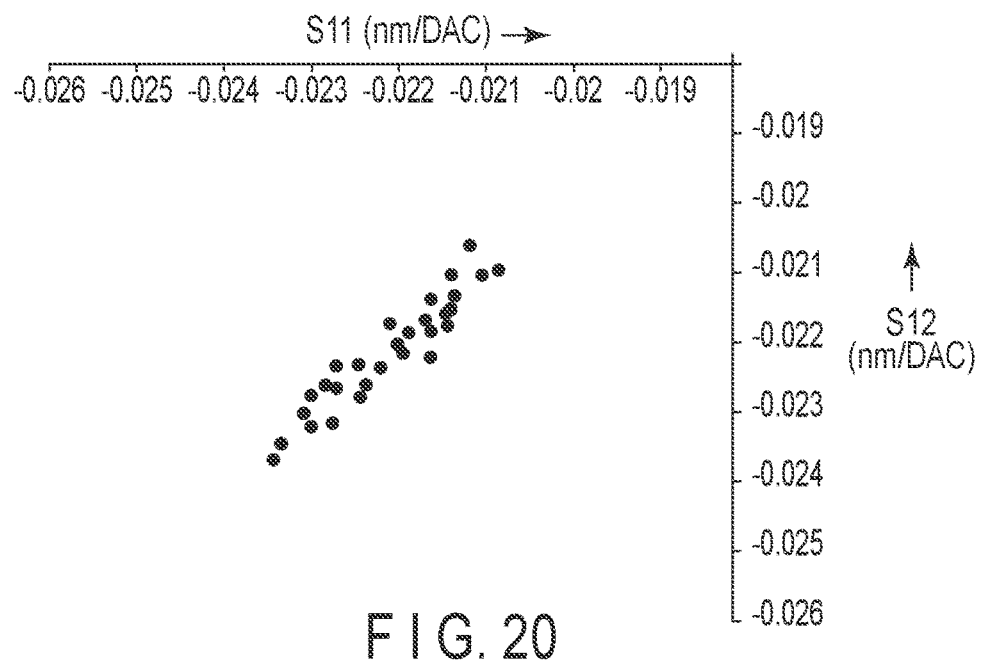
F I G. 20
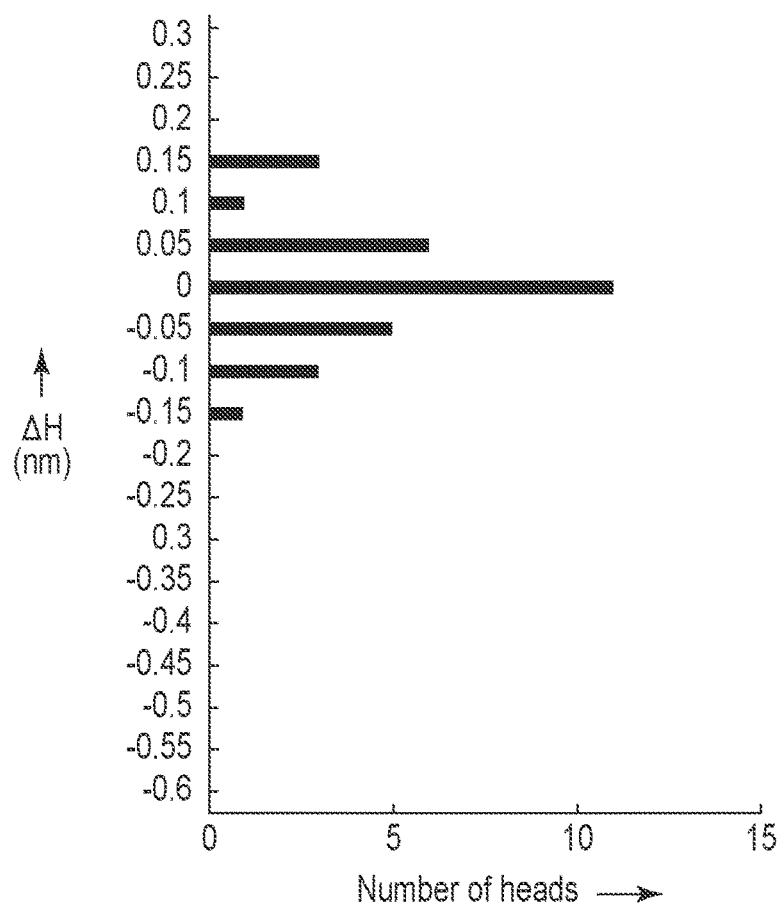
F I G. 21

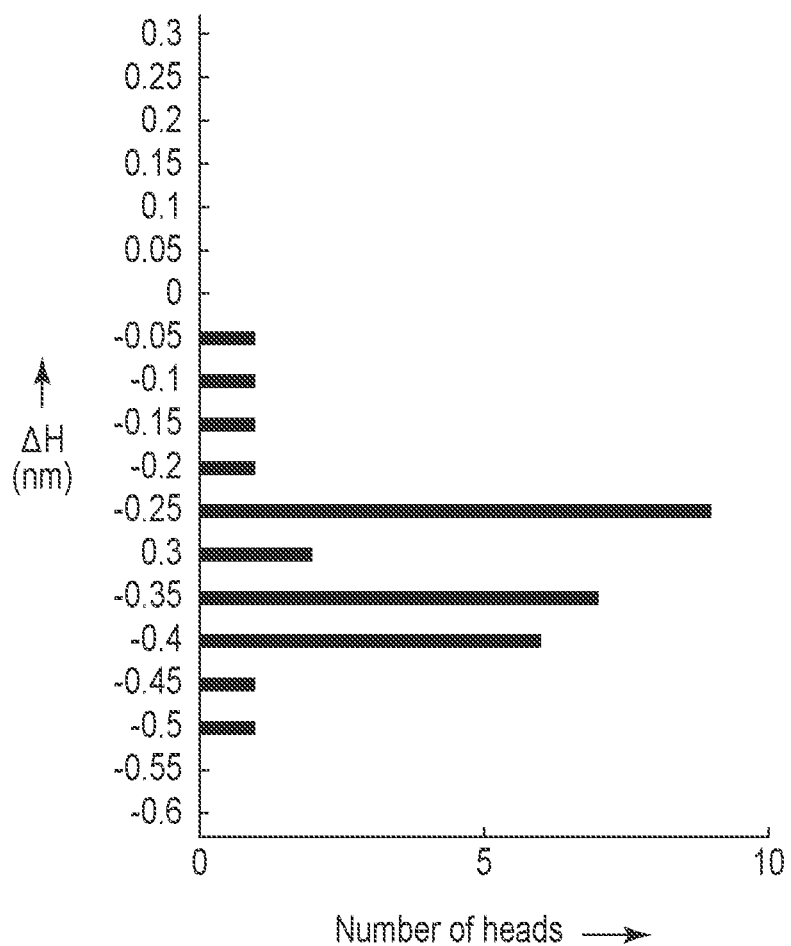
F I G. 22

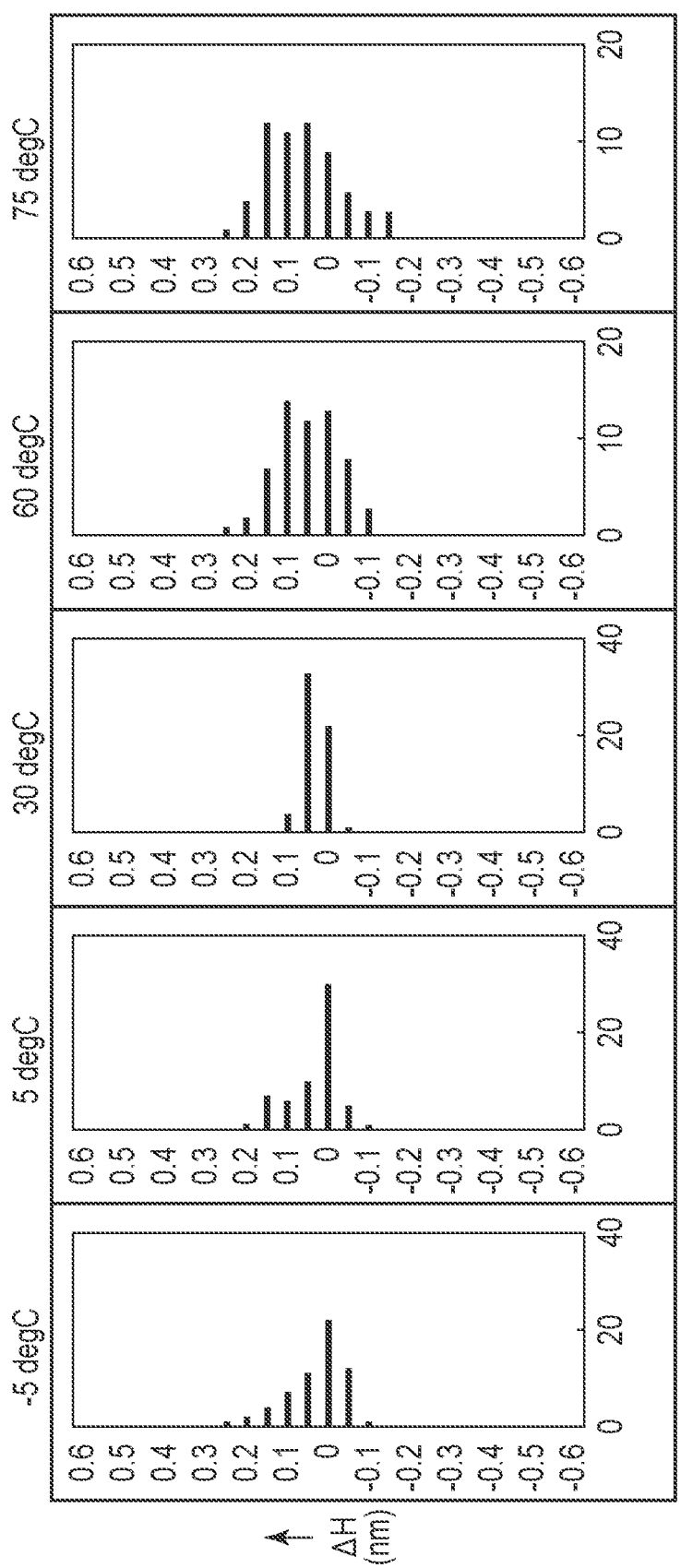
F I G. 23

MAGNETIC DISK DEVICE AND METHOD OF DETECTING FLYING HEIGHT OF MAGNETIC HEAD

CROSS-REFERENCE TO RELATED APPLICATIONS

This application is based upon and claims the benefit of priority from Japanese Patent Application No. 2023-155489, filed Sep. 21, 2023, the entire contents of which are incorporated herein by reference.

FIELD

Embodiments described herein relate generally to a magnetic disk device and a method of detecting flying height of a magnetic head in the magnetic disk device.

BACKGROUND

In a magnetic disk device comprising a magnetic disk and a magnetic head that writes/reads data to/from the magnetic disk, an electric heater is provided in the magnetic head, the magnetic head is thermally expanded toward the magnetic disk by the heat generated by the electric heater, and a flying height of the magnetic head relative to the magnetic disk is controlled by the thermal expansion. The flying height of the magnetic head is also referred to as spacing.

In a process of manufacturing the magnetic disk device, a signal pattern of a specific frequency is written to the magnetic disk as data for measuring the flying height of the magnetic head, and a flying height measuring unit that measures the flying height of the magnetic head based on a read signal of the magnetic head for the data for measuring the flying height is installed in a signal processing circuit of the magnetic disk device. A harmonic sensor circuit using a triple harmonic method (THM) is known as a flying height measurement unit.

After that, a work of reading the data for measuring the flying height, which is written to the magnetic disk by the magnetic head and confirming a measurement value of the flying height measurement unit based on the read signal, to determine whether or not the flying height of the magnetic head has changed from the optimum state at the time of manufacturing, when the magnetic disk device is delivered to a user, is performed by a user or an engineer. When the measurement value deviates from the optimum state to some extent, a work of adjusting the flying height of the magnetic head to the optimum state or a measure of reporting an abnormality are performed by a user or an engineer.

A phenomenon of so-called "thermal fluctuation" that the magnetism is deteriorated by the ambient heat over time occurs in the data for measuring the flying height, which is magnetically written to a magnetic disk.

For this reason, even if the flying height of the magnetic head is measured by the flying height measurement unit when the magnetic disk device is delivered to the user, a deviation (variation) which results from the "thermal fluctuation" is included in the measurement value. Not only the deviation which results from the "thermal fluctuation", but a deviation which results from the temperature characteristics of the above-mentioned signal processing circuit are included in the measurement value.

When the deviations which result from the "thermal fluctuation" and the temperature characteristics are included in the measurement value, the flying height of the magnetic head cannot be adjusted to the optimum state.

BRIEF DESCRIPTION OF THE DRAWINGS

FIG. 1 is a diagram schematically showing a configuration of one embodiment.

FIG. 18 is a graph showing a measurement value Hoa monitored while changing the heater power P from the reference value Po in a decreasing direction at the first time point, and a measurement value Hob monitored while changing the heater power P from the reference value Po in a decreasing direction at the second time point, in one embodiment.

FIG. 19 is a graph showing the measurement value Hoa monitored while changing the heater power P from the reference value Po in a decreasing direction at the first time point, and the measurement value Hob monitored while changing the heater power P from a reference value Po' of the second time point in a decreasing direction at the second time point, in one embodiment.

FIG. 20 is a graph showing a state in which each slope S11 obtained at the first time point distributes for each magnetic head and a state in which each slope S12 obtained at the second time point distributes for each magnetic head, according to one embodiment.

FIG. 21 is a graph showing a state in which a variation ΔH detected by the controller is distributed according to the individual characteristics of the magnetic head.

FIG. 22 is a graph showing a state in which a variation ΔH detected by a conventional method largely is distributed according to the individual characteristics of the magnetic head.

FIG. 23 is a graph showing a state in which the variation ΔH detected in one embodiment is distributed according to the temperature characteristics of the magnetic head and the environmental temperature Tx.

DETAILED DESCRIPTION

Figure 2:
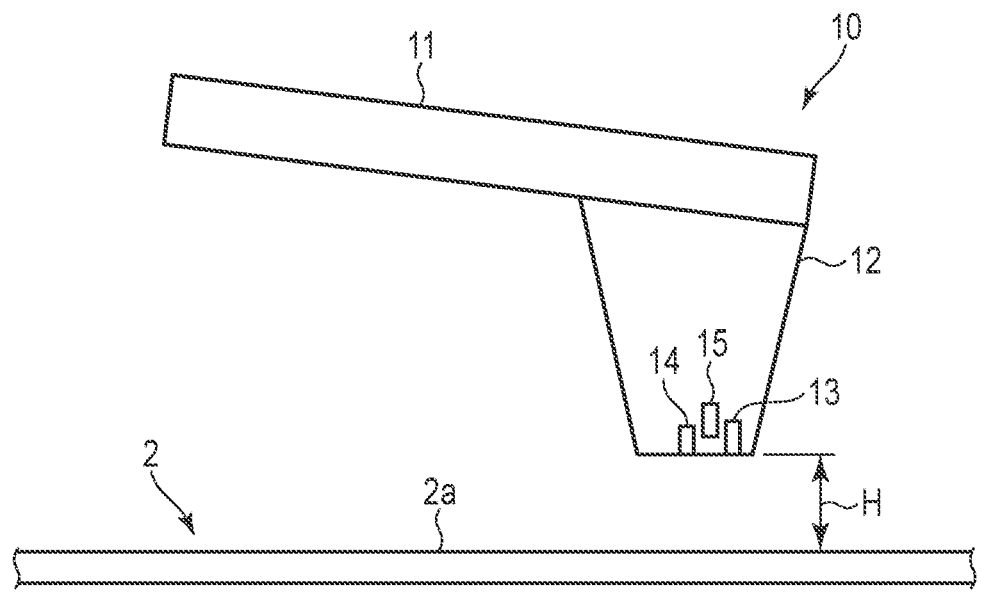
FIG. 2 is a diagram showing a configuration of main parts of a magnetic head according to one embodiment.

In general, according to one embodiment, a magnetic disk device comprising: a magnetic head performing data write to and data read from a magnetic disk, including a heater generating heat with supplied power, and expanding to the magnetic disk side with the generated heat of the heater; a flying height measurement unit measuring a flying height of the magnetic head, based on a read signal of the magnetic head for data for measuring flying height written to the magnetic disk; and a controller controlling the supply power to the heater, wherein the controller detects variation of a measurement value of the flying height measurement unit, based on change of "correspondence between a change amount of the supply power and a measurement value of the flying height measurement unit".

Embodiments will be described hereinafter with reference to the accompanying drawings. Throughout the embodiments, common elements are denoted by like reference numerals, and a detailed description thereof may be omitted unless otherwise necessary. Further, in order to make the description clearer, the widths, thicknesses, shapes, etc., of the respective parts are schematically illustrated in the drawings, compared to the actual modes. These parts can be redesigned or remodeled as needed with reference to the following descriptions and the conventional techniques.

As shown in FIG. 1, a magnetic disk device 1 comprises a disk-shaped magnetic disk 2 as a recording medium. The magnetic disk 2 has a center attached to a rotary shaft of a spindle motor (SPM) 3, and is rotated in a predetermined direction with the power of the spindle motor 3. An arm-shaped actuator 4 is arranged near the magnetic disk 2. Incidentally, not only one but also a plurality of magnetic disks 2 may be mounted on the spindle motor 3. In this configuration, the number of magnetic heads 10 corresponding to the number of magnetic disks 2 are provided. The spindle motor 3 is driven with the electric power supplied from SVC 6.

The actuator 4 has a proximal part pivotally supported at a position displaced from the magnetic disk 2 to be freely rotated and has a distal part extending to a vicinity of a central part of the magnetic disk 2. A voice coil motor (VCM) 5 is arranged at a position corresponding to the proximal part of the actuator 2, and the distal part of the actuator 4 is rotated radially between an inner circumference and an outer circumference of the magnetic disk 2 with the power of the voice coil motor 5.

Figure 3:
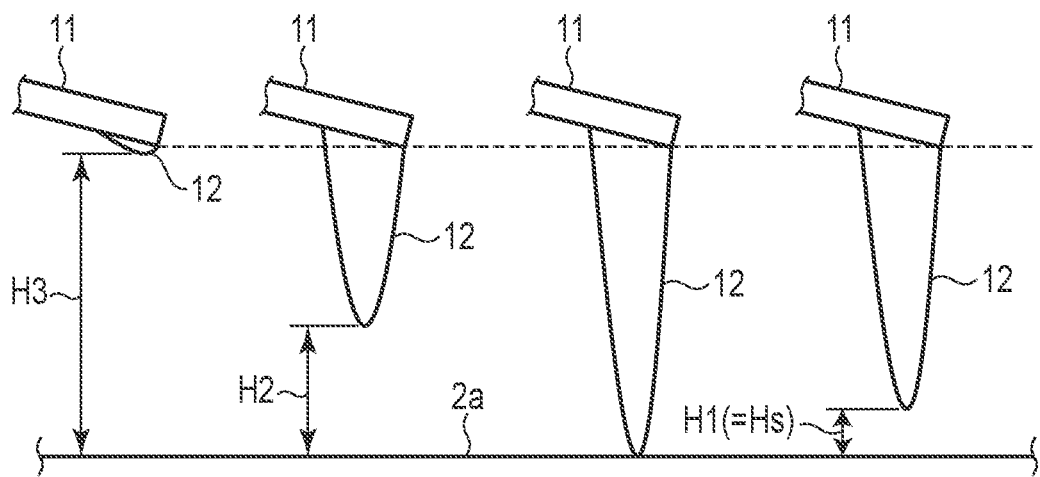
FIG. 3 is a view showing a state in which thermal expansion and flying height H of the magnetic head changes in accordance with a value of a heater power P in one embodiment.

A magnetic head 10 is arranged at the distal part of the actuator 4. As shown in FIG. 2 and FIG. 3, the magnetic head 10 comprises a slider 11 at its distal part, comprises a head element 12 on a lower surface side of the slider 11 (i.e., the side opposed to the magnetic disk 2), and moves (seeks) in the radial direction of the magnetic disk 2 in accordance with the pivotal movement of the actuator 4. A number of servos to which track information and positioning information are written at regular intervals are arranged around the circumference of the magnetic disk 2, and space between these servos is used as a data area. When the magnetic disk 2 rotates, the slider 11 flies with a wind pressure from the rotation and causes the magnetic head 10 to fly away from the magnetic disk 2.

The head element 12 includes a write element 13 that writes magnetic data to the magnetic disk 2, a read element 14 that reads magnetic data from the magnetic disk 2, and an electric heater (also simply referred to as a heater) 15 for heat generation. The write element 13 and the read element 14 are made to face a lower surface of the head element 12 in an exposed state and are opposed to a surface 2a of the magnetic disk 2. The electric heater 15 is arranged inside the head element 12.

A servo combo (SVC) 6 that drives the spindle motor 3 and the voice coil motor 5, a signal processing circuit 21, a flash ROM 23, a DRAM 24, and a hard disk controller (HDC) 25 are connected to the controller (CPU) 20, which serves as the center of control of the magnetic disk device 1. Then, a head amplifier 22 is connected to the signal processing circuit 21, and a host computer 100 is connected to the hard disk controller (HDC) 25.

The head amplifier 22 includes a preamplifier 22a that supplies the power P to the electric heater 15 in accordance with instructions from the controller 20, and a preamplifier 22b that amplifies the read signal output from the read element 14. Then, the head amplifier 22 supplies the write signal (write current) corresponding to the write data supplied from the signal processing circuit 21 to the write element 13, and amplifies the read signal output from the read element 14 by the preamplifier 22a and supplies the amplified signal to the signal processing circuit 21.

The signal processing circuit 21 includes a write channel (WDC) 21a that analog-converts the data for writing supplied from the controller 20 and supplies the data to the head amplifier 22, a read channel (RDC) 21b that digital-converts the read signal supplied from the head amplifier 22 and supplies the signal to the controller 20, and a flying height measurement unit, for example, a harmonic sensor circuit 21c, which measures the flying height H of the magnetic head 10, based on an output of the read channel 21b (read signal Dr to be described later). More specifically, the flying height H of the magnetic head 10 is a distance between the lower surface of the head element 12 of the magnetic head 10 and the surface 2a of the magnetic disk 2. The flying height H is also referred to as spacing H.

Figure 4:
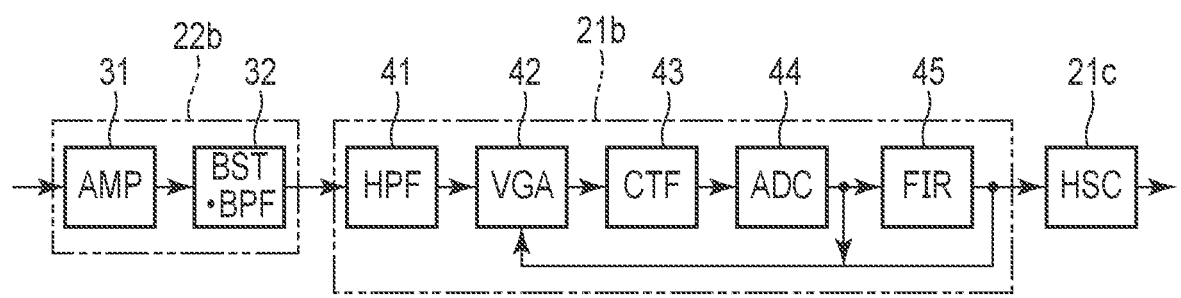
FIG. 4 is a block diagram showing a configuration of a signal processing circuit in FIG. 1.

The head amplifier 22 includes a preamplifier 22b composed of an amplifier 31 and a boost bandpass filter (BST BPF) 32, as shown in FIG. 4. The read channel 21b of the signal processing circuit 21 includes a high-pass filter (HPF) 41, a variable gain amplifier (VGA) 42, a cut-off filter (CTF) 43, an analog-to-digital converter (ADC) 44, and a finite impulse response (FIR) 45, from the input side to the output side.

The harmonic sensor circuit 21c extracts a first-order harmonic component (fundamental wave component) and a third-order harmonic component from the read signal Dr for the data Dw for flying height measurement to be described below, in the output signal of the read channel 21b, and measures the flying height H of the magnetic head 10, by a well-known triple harmonic method (THM) processing based on a ratio of the amplitude value of the first-order harmonic component to the amplitude value of the third-order harmonic component.

The hard disk controller 25 functions as an interface of controlling data write/read together with the controller 20 and controlling data transfer with the host computer 100, including error correction processing and the like.

The controller 20 executes controlling data write/read, servo control necessary for positioning the magnetic head 10 to the target track on the magnetic disk 2, control of the power P supplied to the electric heater 15, and the like. In addition, the controller 20 executes a process to detect variation of the measurement value H of the harmonic sensor circuit 21c from the initial state, based on changes in "the correspondence between the amount of change in the supplied power P and the measurement value (measured flying height) H of the harmonic sensor circuit 21c". The initial state of the measurement value H refers to the measurement value H obtained immediately after the data Dw for measuring the flying height is written to the magnetic disk 2.

The flash ROM 23 is a nonvolatile memory and stores control programs and various data executed by the controller 20. A characteristic table 23a including various characteristic data used to detect the variation ΔH to be described below is stored in the flash ROM (storage means) 23. The DRAM 24 is a volatile memory and functions as a work area or the like when the controller 20 executes the control program in the flash ROM 23.

<Thermal Expansion of Head Element 12>

During the rotation of the magnetic disk 2, spacing occurs between the head element 12 and the surface 2a of the magnetic disk 2 by the action of the slider 11. In order to achieve high-density recording to the magnetic disk 2, it is necessary to reduce this spacing and make a distance among the head element 12, the surface 2a of the magnetic disk 2, and the magnetic disk 2 closer to the limit. When power is supplied to the electric heater 15 of the head element 12, the electric heater 15 generates heat, and the head element 12 thermally expands toward the magnetic disk 2 with the generated heat. This thermal expansion causes the write element 13 and the read element 14 to protrude toward the magnetic disk 2 and to approach the surface 2a of the magnetic disk 2. By controlling the power P supplied to the electric heater 15, the spacing between the head element 12 and the surface 2a of the magnetic disk 2, i.e., the flying height H of the magnetic head 10, can be adjusted to an appropriate state. The power P supplied to the electric heater 15 is referred to as the heater power P.

A state in which the thermal expansion of the head element 12 and the flying height H change according to the value of the heater power P is shown in FIG. 3. When the heater power P is 0, the flying height H is H3. When the heater power P is gradually increased from 0, the head element 12 thermally expands toward the magnetic disk 2 and the flying height H decreases to H2. When the heater power P is further increased, the head element 12 further expands thermally, the flying height H becomes 0, and the head element 12 becomes in a touchdown state of being in contact with the surface 2a of the magnetic disk 2. When the heater power P is reduced from this touchdown state to P2, the thermal expansion of the head element 12 decreases such that the head element 12 is moved away from the surface 2a of the magnetic disk 2 and the flying height H becomes H1 (=for example, target value Hs), which is larger than 0.

The flying height H of the magnetic head 10 caused by the slider 11 is not constant due to influences such as individual differences in the magnetic head 10, the seek position of the magnetic head 10 in the radial direction of the magnetic disk 2, and the change in the environmental temperature Tx. For this reason, adjustment to guide the flying height H to a target value Hs based on the heater power P when the magnetic head 10 becomes in the touchdown state is considered as a general method of solution.

<Data Dw for Measuring Flying Height and Read Signal Dr>

Figure 5:
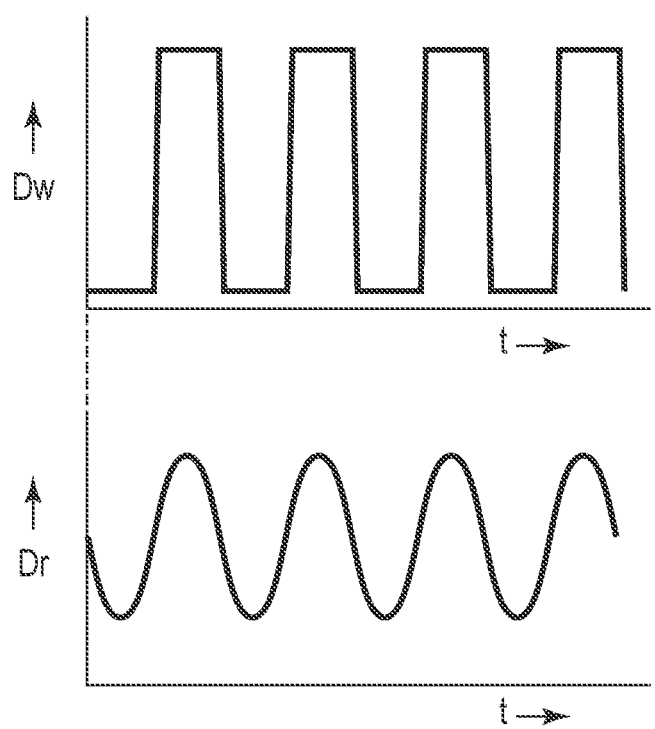
FIG. 5 is a graph showing data Dw for measuring the flying height and its read signal Dr in one embodiment.

In the process of manufacturing the magnetic disk device 1, a rectangular signal pattern which repeatedly changes between "0" and "1" levels at a specific frequency as shown in, for example, FIG. 5 is written to the magnetic disk 2 as the data Dw for measuring the flying height, such that the flying height H of the magnetic head 10 can be measured and adjusted by, for example, the user. A read signal Dr whose level changes in a sinusoidal shape as shown in FIG. 5 is obtained by reading the data Dw for measuring the flying height by the magnetic head 10.

Figure 6:
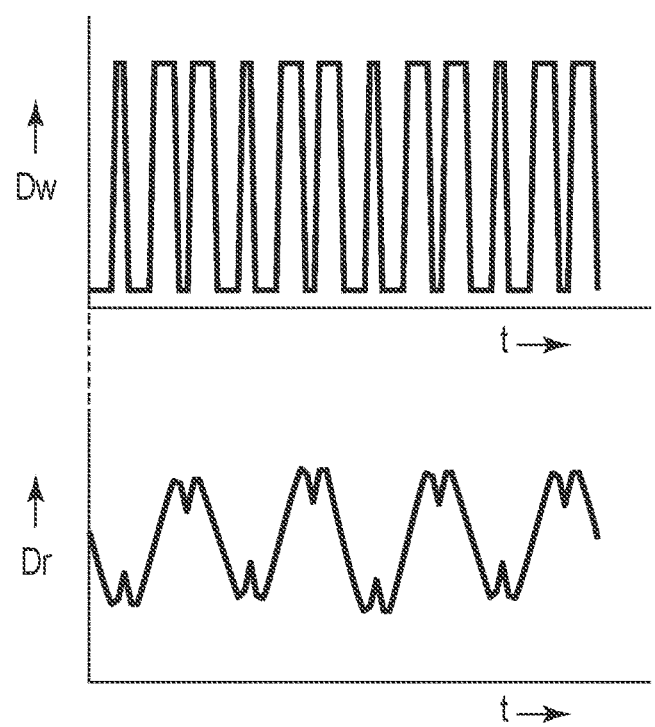
FIG. 6 is a graph showing the other example of the data Dw for measuring the flying height and its read signal Dr in one embodiment.

Not only the data Dw for measuring the flying height as shown in FIG. 5, but the rectangular signal pattern which irregularly repeats changing between "0" and "1" levels at a specific frequency as shown in FIG. 6 may be written to the magnetic disk 2 as the data Dw for measuring the flying height. A read signal Dr of a waveform which includes distortion at a peak level while changing its level in a sinusoidal shape as shown in FIG. 6 is obtained by reading the data Dw for measuring the flying height by the magnetic head 10. The data Dw for measuring the flying height in FIG. 6 is disclosed in, for example, U.S. Pat. No. 9,502, 063B1 and the like, as bit pattern data that enhances the spectrum of the third-order harmonic component.

<Variation ΔH from Initial State of Measurement Value H>

A phenomenon of so-called "thermal fluctuation" that the magnetism is deteriorated by the ambient heat over time occurs in the data Dw for measuring the flying height, which is written to the magnetic disk 2. Even if the harmonic sensor circuit 21c measures the flying height H of the magnetic head 10 in the state in which the "thermal fluctuation" occurs, a deviation which results from the "thermal fluctuation" is included in the measurement value H.

Figure 7:
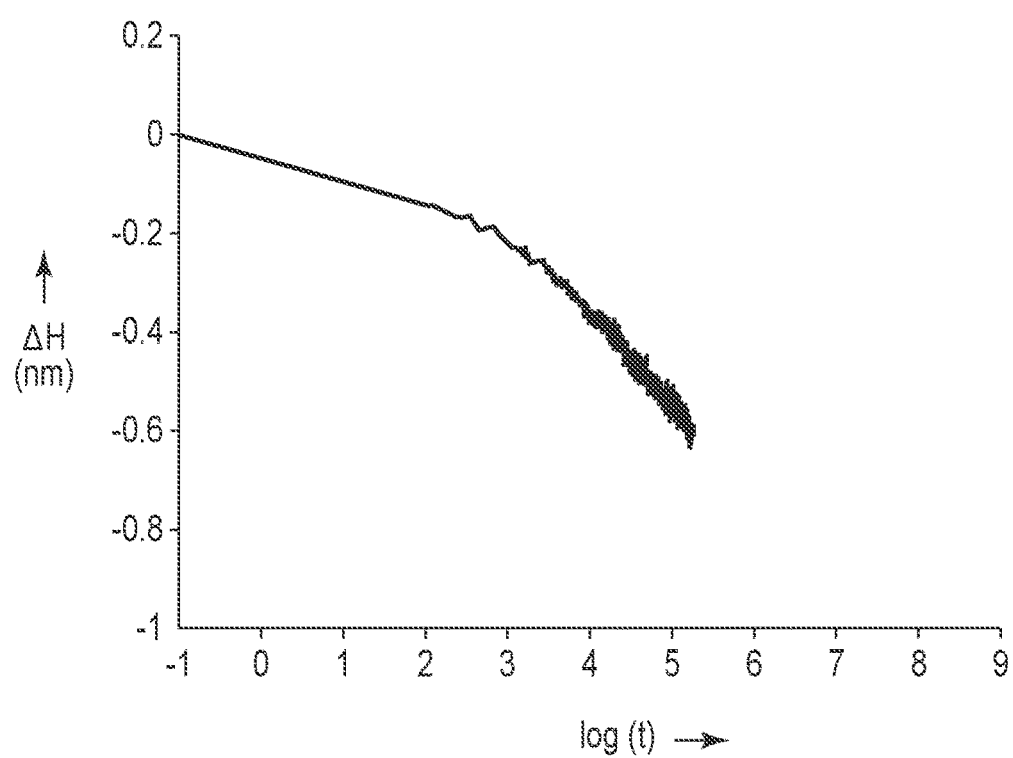
FIG. 7 is a graph showing a state in which a deviation which results from "thermal fluctuation" occurs in the measurement value H of the harmonic sensor circuit in one embodiment.

FIG. 7 shows a state in which the variation ΔH (nm) resulting from the "thermal fluctuation" occurs in the flying height H measured by the harmonic sensor circuit 21c based on the read signal Dr of the magnetic head 10 for the data Dw for measuring the flying height at an ambient temperature Tx=70° C. The measurement value H of the harmonic sensor circuit 21c becomes smaller as the time elapses although the actual flying height H of the magnetic head 10 is constant.

Figure 8:
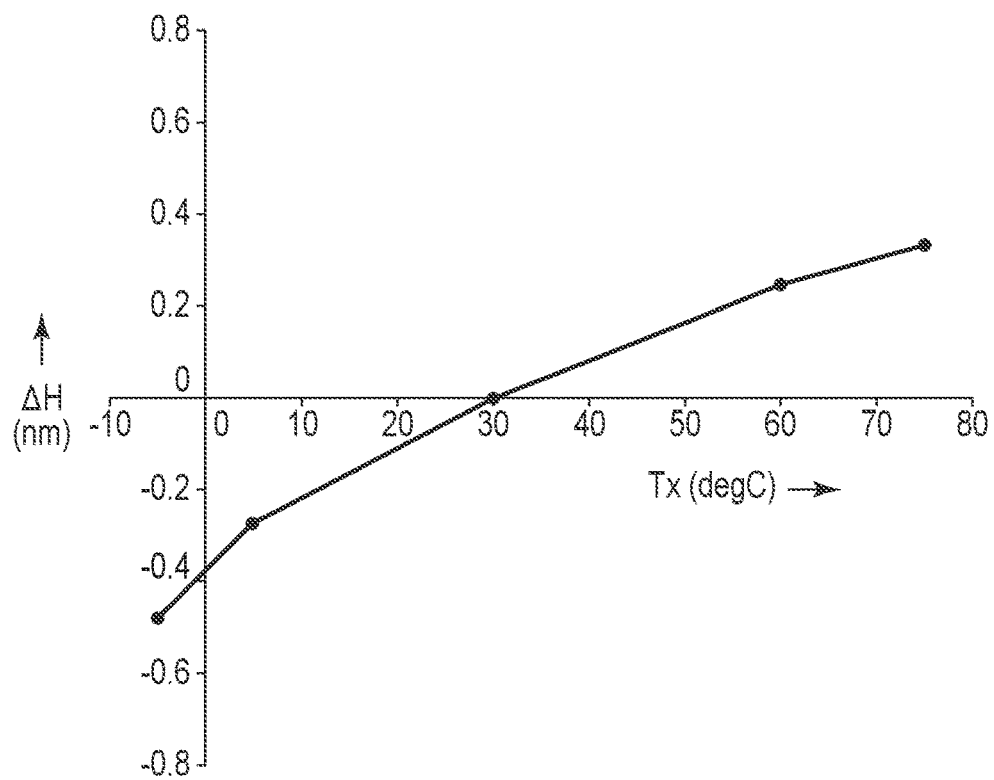
FIG. 8 is a graph showing a state in which the measurement value H of the harmonic sensor circuit changes in accordance with the environmental temperature Tx in one embodiment.

Furthermore, a signal path in which the read signal Dr of the magnetic head 10 reaches the harmonic sensor circuit 21c (i.e., the preamplifier 22a of the head amplifier 22 and the read channel 21b of the signal processing circuit 21) has temperature characteristics. The temperature characteristics also affect the measurement value H of the harmonic sensor circuit 21c. FIG. 8 shows a state in which the measurement value H of the harmonic sensor circuit 21c changes in accordance with the environmental temperature Tx (degC).

<Expression for Obtaining Variation ΔH from Initial State of Measurement Value H>

The variation ΔH from the initial state of the measurement value H of the harmonic sensor circuit 21c can be obtained by calculation of the following Expression (1) based on a harmonic component of the read signal Dr of the magnetic head 10 for the data Dw for measuring the flying height immediately after the data Dw for measuring the flying height is written to the magnetic disk 2 (at the first time point), and a harmonic component of the read signal Dr of the magnetic head 10 for the data Dw for measuring the flying height after a predetermined time after the data Dw for measuring the flying height is written to the magnetic disk 2 (at the second time point).

$$\Delta H = K(\ln(V11/V13) - \ln(V01/V03)) + Cr + Ct \quad (1)$$

K is an intrinsic coefficient (λ/4π) based on a wavelength λ of a signal of the data Dw for measuring the flying height. ln means a natural logarithm. V11 is an amplitude value of the first-order harmonic component of the read signal Dr after the above predetermined time. V13 is an amplitude value of the third-order harmonic component of the read signal Dr after the above predetermined time. V01 is an amplitude value of the first-order harmonic component of the read signal Dr immediately after writing. V03 is an amplitude value of the third-order harmonic component of the read signal Dr immediately after writing. Cr is a correction value for the "thermal fluctuation". Ct is a correction value on the temperature characteristics of the preamplifier 22a, the read channel 21b, and the like.

However, since the influence of the "thermal fluctuation" varies in accordance with the elapse of time and the environmental temperature Tx, appropriately obtaining the correction value Cr on the "thermal fluctuation" is difficult. Since the preamplifier 22a and the lead channel 21b also have various temperature characteristics, appropriately obtaining the correction value Ct on the temperature characteristics is also difficult.

<Slope (First Slope) So of Measurement Value H at First Time Point>

Figure 9:
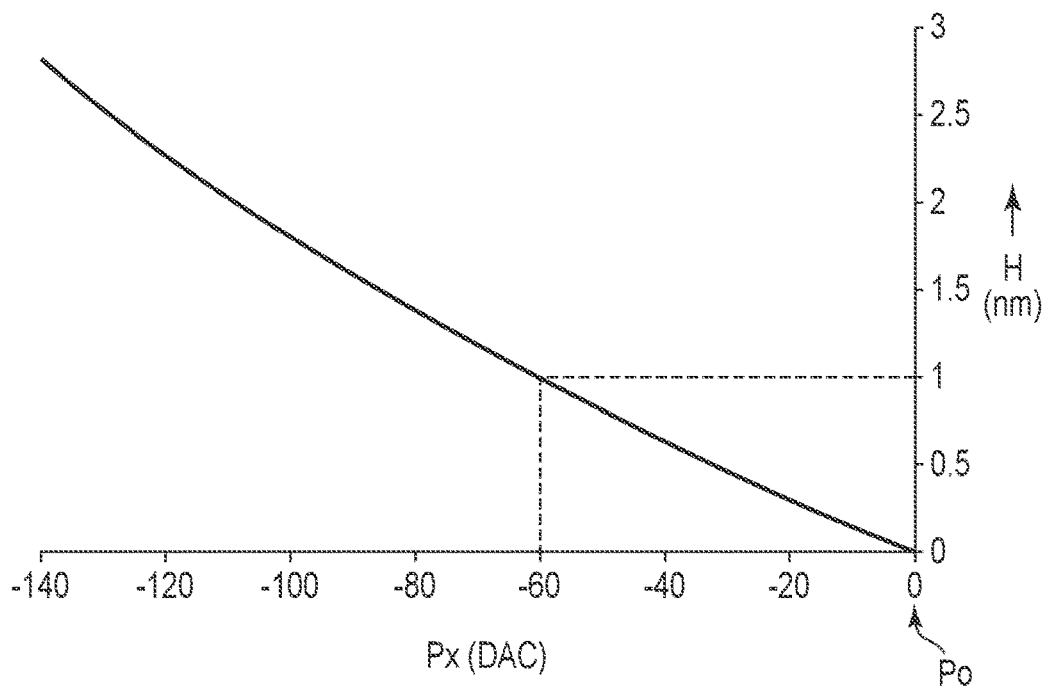
FIG. 9 is a graph showing a first correspondence between the measurement value H of the harmonic sensor circuit and a variation Px of the heater power P from a reference value Po at a first time point in one embodiment.

In the process of manufacturing the magnetic disk device 1, the heater power P at the time when the measurement value H of the harmonic sensor circuit 21c becomes "0" is referred to as a reference value Po, more specifically, at the first time point immediately after writing the data Dw for measuring the flying height to the magnetic disk 2 (a situation not yet affected by the "thermal fluctuation"), the data Dw for measuring the flying height is read by the magnetic head 10 while largely changing the heater power P in a decreasing direction from the reference value Po, the measurement value H of the harmonic sensor circuit 21c based on the read signal Dr is monitored, a first correspondence between the monitored measurement value H and the variation Px of the heater power P from the reference value Po is shown in FIG. 9. In the example shown in FIG. 9, the measurement value H=1 [nm] when the variation Px=−60 [DAC].

The measurement value H of the harmonic sensor circuit 21c is varied in a quadratic curve relative to the variation Px of the heater power P. The reason for variation in a quadratic curve is because as the head element 12 of the magnetic head 10 is closer to the surface 2a of the magnetic disk 2, the head element 12 can be affected by cooling from the magnetic disk 2 more easily and the thermal expansion of the head element 12 becomes smaller.

In FIG. 9, the measurement value H of the harmonic sensor circuit 21c for the variation Px of the heater power P from the reference value Po can be obtained as a quadratic approximation by the following Expression (2). Ao and Bo are coefficients that vary in accordance with the environmental temperature Tx. In other words, the measurement value H (quadratic approximation) of the harmonic sensor circuit 21c can be obtained when the heater power P is at a predetermined value (reference value Po+variation Px) by substituting the value of the variation Px into the Expression (2), which is a quadratic approximation formula.

$$H = Ao \times Px^{\wedge}2 + Bo \times Px \quad (2)$$

Figure 10:
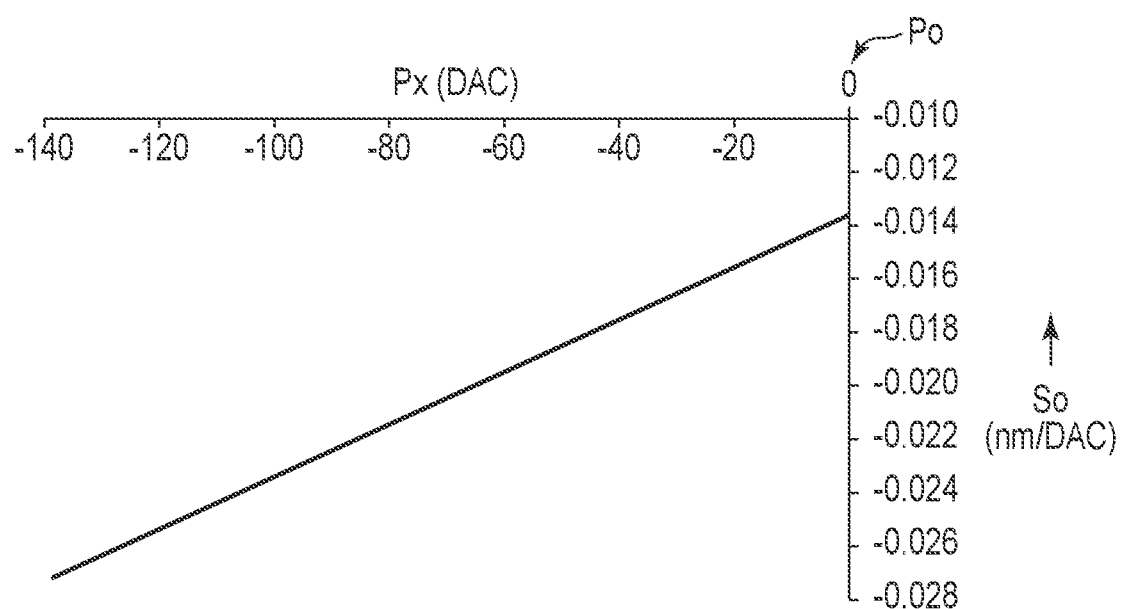
FIG. 10 is a graph showing a second correspondence between a slope So and the variation Px of the heater power P from the reference value Po at the first time point in one embodiment.

By performing one differential operation on the measurement value (quadratic approximation) H obtained by the Expression (2), a slope (first slope; also referred to as a slope value) So of the change in the measurement value (quadratic approximation) H can be obtained. A second correspondence between the obtained slope So and the variation Px of the heater power P from the reference value Po is shown in FIG. 10. The slope So of the measurement value (quadratic approximation) H of the harmonic sensor circuit 21c at the time when the heater power P is at a predetermined value (reference value Po+variation Px) can be obtained by the following Expression (3).

$$So = 2 \times Ao \times Px + Bo \quad (3)$$

Figure 11:
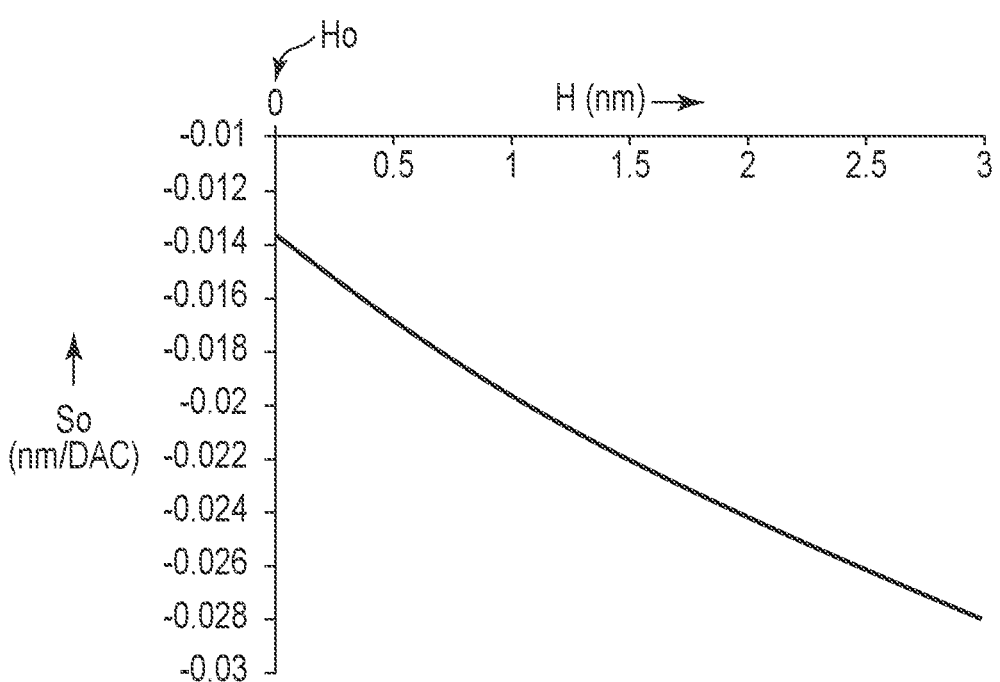
FIG. 11 is a graph showing a third correspondence between the slope So of FIG. 10 and the measurement value H of FIG. 9 in one embodiment.

A "third correspondence between the slope So and the measurement value (quadratic approximation) H" shown in FIG. 11 can be derived based on the first correspondence [Expression (2)] between the measurement value (quadratic approximation) H and the variation Px of the heater power P from the reference value Po and the second correspondence [Expression (3)] between the slope So and the variation Px of the heater power P from the reference value Po. The data of this third correspondence is stored in advance in the flash ROM 23 together with the data of the Expression (2) representing the first correspondence and the data of the Expression (3) representing the second correspondence.

<Slope (Second Slope) S1 of Two-Point Measurement Value H>

The measurement value (quadratic approximation) H of the harmonic sensor circuit 21c of the harmonic sensor circuit 21c in a case where the heater power P is varied between a first predetermined value (i.e., a value at which the variation Px from the reference value Po is, for example, "−20 [DAC]") and a second predetermined value (i.e., a value at which the variation Px from the reference value Po is, for example, "−100 [DAC]") is obtained from the above Expression (2).

Figure 12:
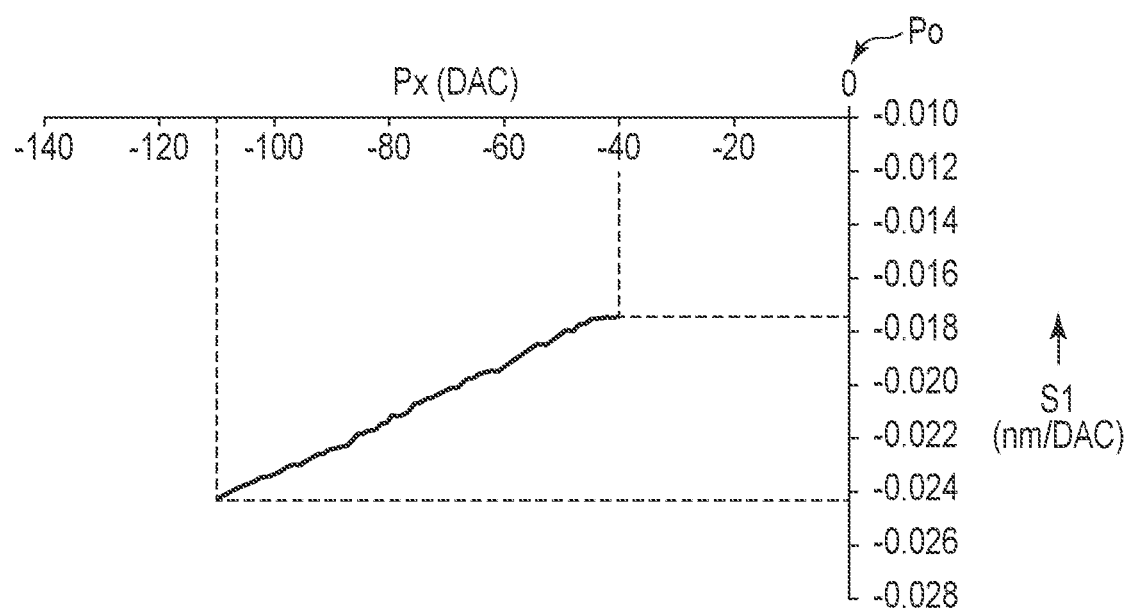
FIG. 12 is a graph showing a correspondence between the slope S1 and the variation Px of the heater power P at the first time point in one embodiment.

For example, by substituting "−20 [DAC]" into the Expression (2) as the value of the variation Px, the measurement value (quadratic approximation) H of the harmonic sensor circuit 21c at the time when the heater power P is at the above first predetermined value, i.e., 0.306 [nm], can be obtained. Alternatively, by substituting "−100 [DAC]" into the Expression (2) as the value of the variation Px, the measurement value (quadratic approximation) H of the harmonic sensor circuit 21c at the time when the heater power P is at the above second predetermined value, i.e., 1.855 [nm], can be obtained. The slope S1 of the two-point measurement can be obtained as −0.0194 from the difference between the heater powers P at the first predetermined value and the second predetermined value, i.e., −80 [DAC], and the difference of H, i.e., 1.549 [nm]. The heater power P uses S1 as a slope to an average value −60 [DAC] of the first predetermined value and the second predetermined value. As an operation of this example, the calculation of the slope S1 is repeated in a range of the first predetermined value from 0 to −70 [DAC] and a range of the second predetermined value from −80 to −150 [DAC] without changing the difference between the first predetermined value and the second predetermined value, and a relationship between the average value of the first predetermined value and the second predetermined value, from −40 to −110 [DAC], and the slope S1 is shown in FIG. 12. In FIG. 12, when the average value of the first predetermined value and the second predetermined value is used as Px, this correspondence between the slope S1 and the variation Px is substantially the same as the second correspondence (FIG. 10) between the slope So and the variation Px at the first time point.

Figure 13:
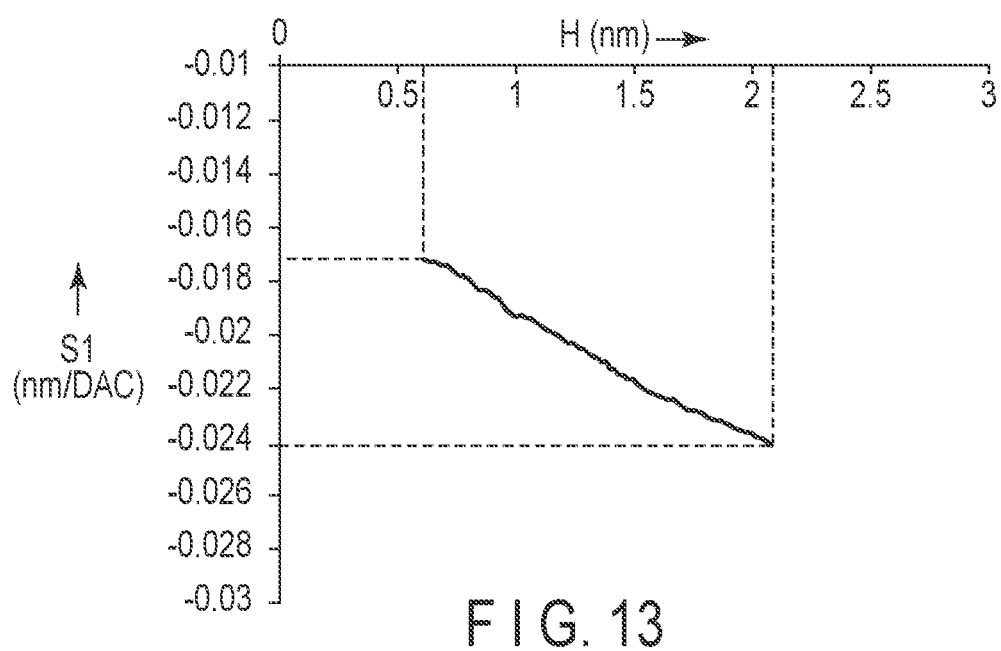
FIG. 13 is a graph showing a correspondence between the measurement value H and the slope S1 at the first time point in one embodiment.

A correspondence between the slope S1 and the measurement value (quadratic approximation) H is shown in FIG. 13. This correspondence (FIG. 13) between the slope S1 and the measurement value (quadratic approximation) H is substantially the same as the third correspondence (FIG. 11) between the slope So and the measurement value (quadratic approximation) H at the first time point.

It can be therefore said that the measurement value (quadratic approximation) H of the harmonic sensor circuit 21c at the time when the heater power P is, for example, the average value [=(first predetermined value+second predetermined value)/2] of the first predetermined value and the second predetermined value can be obtained by calculating the slope S1.

<Measurement of Variation ΔH from Initial State of Measurement Value H>

At the second time point after elapse of a predetermined time from the writing of the data Dw for measuring the flying height to the magnetic disk 2 (a situation in which the magnetic disk 2 has already been affected by the "thermal fluctuation"), the data Dw for measuring the flying height is read with the magnetic head 10 by setting the heater power P to the first predetermined value (reference value Po+variation Pa), the measurement value H of the harmonic sensor circuit 21c based on the read signal Dr is captured as a first capture value Ha, the data Dw for measuring the flying height is read with the magnetic head 10 by setting the heater power P to the second predetermined value (reference value Po+variation Pb), and the measurement value H of the harmonic sensor circuit 21c based on the read signal Dr is captured as a second capture value Hb. The second predetermined value (reference value Po+variation Pb) is lower than the first predetermined value (reference value Po+variation Pa).

The slope (second slope) S1 of the change in the measurement value H between the first capture value capture value Ha and the second capture value capture value Hb can be obtained by the following Expression (4). The data of this Expression (4) is stored in advance in the flash ROM 23.

$$S1=\{[K(\ln(V11a/V13a)-\ln(V01/V03))+Cr+Ct]-[K(\ln(V11b/V13b)-\ln(V01/V03))+Cr+Ct]\}/(Pa-Pb)=K[\ln((V11a\times V13b)/(V13a\times V11b))]/(Pa-Pb) \quad (4)$$

V11a is an amplitude value of the first-order harmonic component of the read signal Dr of the magnetic head 10 at the time when the heater power P is the first predetermined value (reference value Po+variation Pa). V13a is an amplitude value of the third-order harmonic component of the read signal Dr of the magnetic head 10 at the time when the heater power P is the first predetermined value (reference value Po+variation Pa). V11b is an amplitude value of the first-order harmonic component of the read signal Dr of the magnetic head 10 at the time when the heater power P is the first predetermined value (reference value Po+variation Pb). V13b is an amplitude value of the third-order harmonic component of the read signal Dr of the magnetic head 10 at the time when the heater power P is the first predetermined value (reference value Po+variation Pb).

It can be understood from the Expression (4) that in the process of obtaining the slope S1 at the second point in time, considering the correction value Cr for the "thermal fluctuation" is unnecessary and considering the correction value Ct for the temperature characteristics of the preamplifier 22a, the read channel 21b, and the like is also unnecessary.

When the variation ΔH of the measurement value H of the harmonic sensor circuit 21c from the initial state is zero, the slope S1 at the second time point is the same as the slope So at the first time point regardless of the presence or absence of the "thermal fluctuation".

Therefore, the variation ΔH of the measurement value H of the harmonic sensor circuit 21c from the initial state can be accurately detected without being affected by the "thermal fluctuation" or the temperature characteristics, by comparing the slope So at the first time point with the slope S1 obtained from the Expression (4) at the second time point.

The variation ΔH of the measurement value H of the harmonic sensor circuit 21c from the initial state can be represented by the difference between the value of the heater power P at the time of obtaining the slope So and the value of the heater power P at the time of obtaining the slope S1, based on the relationship between the Expression (3), which expresses the slope So at the first time point, and the Expression (4), which expresses the slope S1 at the second time point.

When the value of the heater power P in determining the slope S1 is referred to as P1, the value P1 can be calculated by the following Expression (5).

$$P1=\{K[\ln((V11a\times V13b)/(V13a\times V11b))]/(Pa-Pb)-Bo\}/(2\times Ao) \quad (5)$$

As described above, V11a is an amplitude value of the first-order harmonic component of the read signal Dr of the magnetic head 10 at the time when the heater power P is the first predetermined value (reference value Po+variation Pa). V13a is an amplitude value of the third-order harmonic component of the read signal Dr of the magnetic head 10 at the time when the heater power P is the first predetermined value (reference value Po+variation Pa). In addition, V11b is an amplitude value of the first-order harmonic component of the read signal Dr of the magnetic head 10 at the time when the heater power P is the first predetermined value (reference value Po+variation Pb). V13b is an amplitude value of the third-order harmonic component of the read signal Dr of the magnetic head 10 at the time when the heater power P is the first predetermined value (reference value Po+variation Pb).

In Expression (2) which expresses the first correspondence between the measurement value H and the variation Px, the difference between the measurement value H calculated by substituting the above value P1 for the variation Px and the measurement value H calculated by substituting an average value of the above variation Pa and the above variation Pb [=(variation Pa+variation Pb)/2] for the variation Px is the variation ΔH of the measurement value H from the initial state. This variation ΔH can be calculated by the following Expression (6).

$$\Delta H=Ao\times\{P1^{\wedge}2-[(Pa+Pb)/2]^{\wedge}2\}+Bo\times[P1-(Pa+Pb)/2] \quad (6)$$

When the variation ΔH is obtained by the operations of the Expressions (5) and (6), the read operation of the magnetic head 10 is performed by setting the heater power P to the first predetermined value (reference value Po+variation Pa), the read operation of the magnetic head 10 is performed by setting the heater power P to the second predetermined value (reference value Po+variation Pb), the amplitude value V11a of the first-order harmonic component and the amplitude value V13a of the third-order harmonic component of the read signal Dr at the time when the heater power P is at the first predetermined value (reference value Po+variation Pa) are extracted from the harmonic sensor circuit 21c, and the amplitude value V11b of the first-order harmonic component and the amplitude value V13b of the third-order harmonic component of the read signal Dr at the time when the heater power P is at the second predetermined value (reference value Po+variation Pb) are extracted from the harmonic sensor circuit 21c.

In the process of obtaining the variation ΔH according to the Expression (6), the process of changing the heater power P until the magnetic head 10 becomes in the touchdown state is unnecessary, and the heater power P is changed only at two points, i.e., the first predetermined value and the second predetermined value, and the time required to detect the variation ΔH can be reduced. Since the process of repeating the read operation of the magnetic head 10 while repeatedly changing the heater power P is unnecessary, the variation ΔH can be detected without placing a burden on the performance of the magnetic disk device 1.

When the detected variation ΔH exceeds a permissible threshold value, the user or the engineer can perform a work of adjusting the flying height H of the magnetic head 10 or a measure to report an abnormality.

However, the above Expressions (5) and (6) do not include correction for the temperature characteristics of the thermal expansion of the magnetic head 10.

Figure 14:
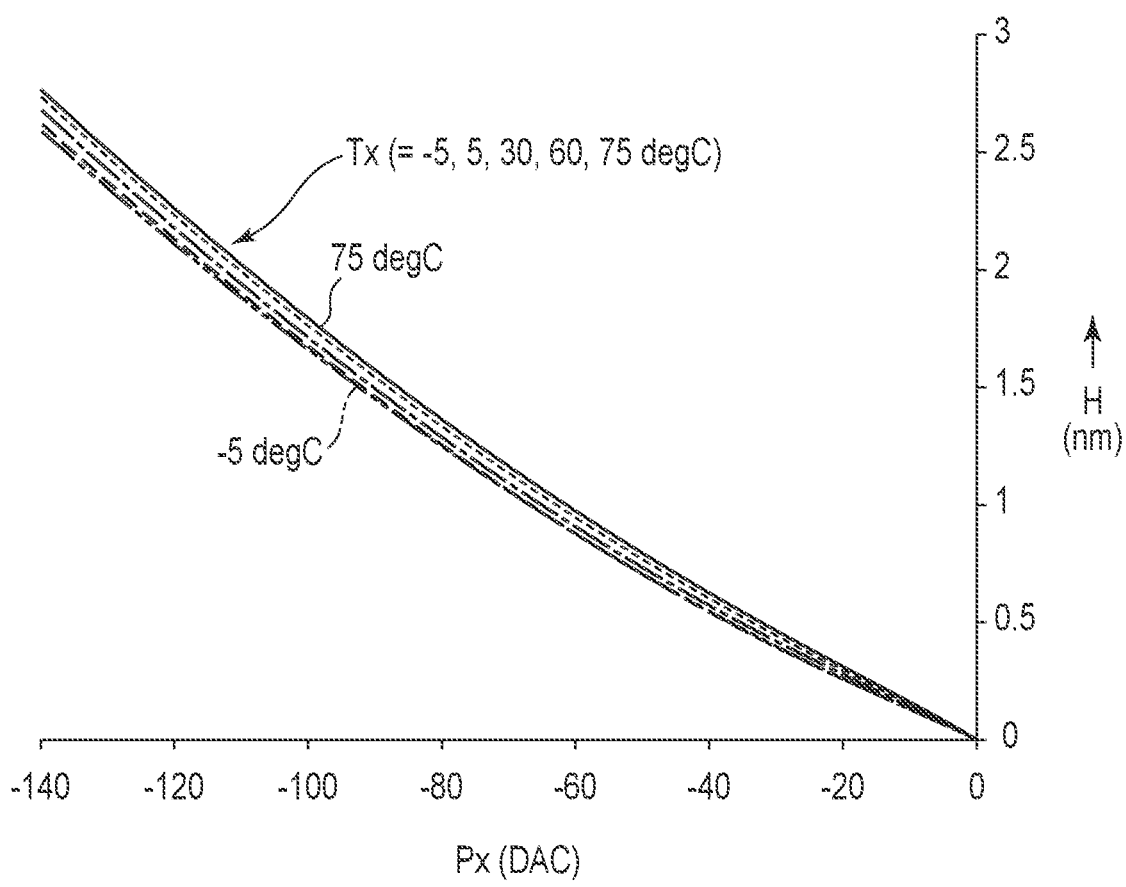
FIG. 14 is a graph showing a state in which an average value of each measurement value H of the flying height measurement unit based on the read signals Dr of a plurality of magnetic heads changes with the environmental temperature Tx used as a parameter, according to one embodiment.

FIG. 14 shows a state in which each of the measurement values H of the harmonic sensor circuit 21c is monitored based on the read signals Dr of a plurality of magnetic heads 10 prepared as samples in the same manner as the process described with reference to FIG. 9, and an average value of each monitored measurement value H changes with the environmental temperature Tx (=−5, 5, 30, 60, and 75 [degC]) serving as a parameter (the temperature characteristic of the average thermal expansion of each magnetic head 10).

More specifically, the heater power P at the time when each of the measurement values H of the harmonic sensor circuit 21c based on the read signals Dr of the plurality of magnetic heads 10 becomes "0" is set as the reference value Po, the data Dw for measuring the flying height is read by each of the magnetic heads 10 while greatly changing the heater power P in a decreasing direction from each reference value Po, each measurement value H of the harmonic sensor circuit 21c based on the read signal Dr of each magnetic head 10 is monitored, and a relationship between the average value of each monitored measurement value H and the variation Px of the heater power P from the reference value Po is shown for each environmental temperature Tx in the graph.

In this example, since the reference value Po of the heater power P is obtained for each environmental temperature Tx, the "deviation" which occurs in the average value of each measurement value H can be considered not as the "deviation" which results from the temperature characteristics Ct of the preamplifier 22a, the read channel 21b, and the like in the Expression (1), but the "deviation" which results from the temperature characteristics of the average thermal expansion of each of the magnetic heads 10.

Figure 15:
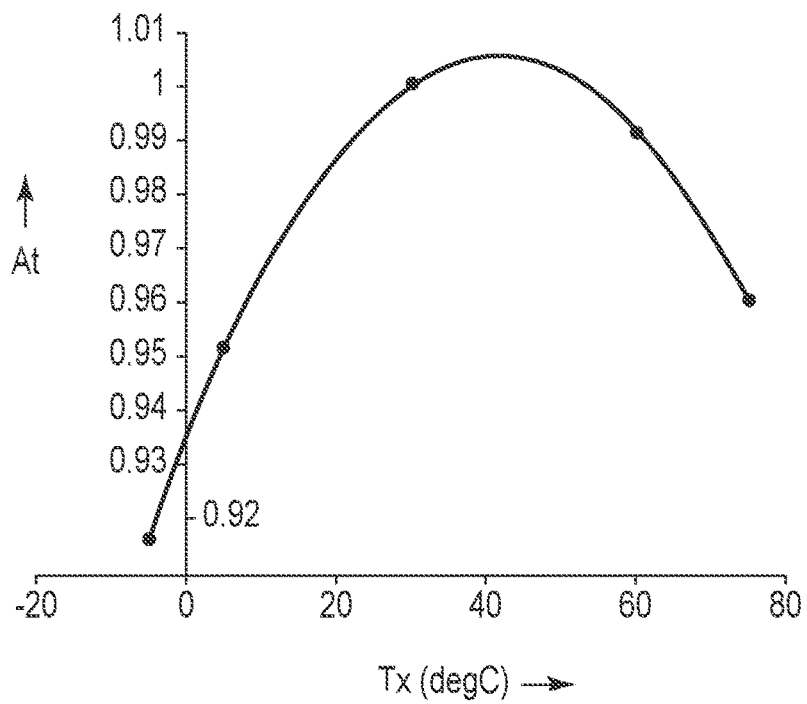
FIG. 15 is a graph showing a change rate At of a coefficient AO in one embodiment.

FIG. 15 indicates that the coefficient Ao in the Expression (2), which represents the first correspondence between the measurement value (quadratic approximation) H and the variation Px, changes at a rate At determined in accordance with the environmental temperature Tx. This change rate At increases as the environmental temperature Tx increases in the range of the environmental temperature Tx from a negative value to approximately 40 [degC], and decreases as the environmental temperature Tx increases in the range of the environmental temperature Tx from approximately 40 [degC] to approximately 75 [degC]. The change rate At="1" when the ambient temperature Tx=30 [degC].

Figure 16:
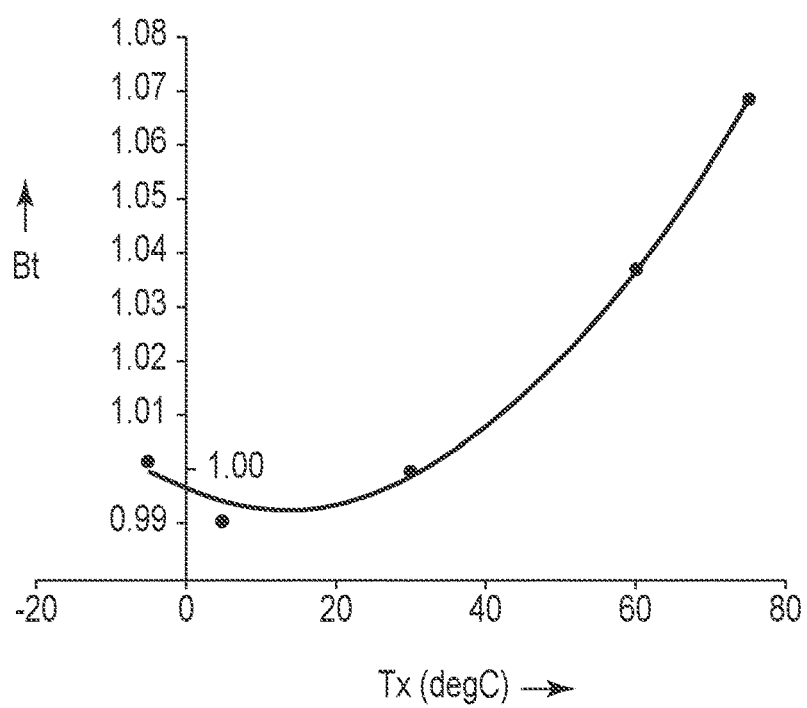
FIG. 16 is a graph showing a change rate Bt of a coefficient BO in one embodiment.

FIG. 16 indicates that the coefficient Bo in the Expression (2) changes at a rate Bt determined in accordance with the environmental temperature Tx. This change rate Bt decreases as the environmental temperature Tx increases in the range of the environmental temperature Tx from a negative value to approximately 10 [degC], and increases as the environmental temperature Tx increases in the range of the environmental temperature Tx from approximately 10 [degC] to approximately 75 [degC]. The change rate Bt="1" when the ambient temperature Tx=30 [degC].

In the process of manufacturing the magnetic disk device 1, the environmental temperature Tx=30 [degC] at which both the change rates At and Bt become "1" is defined as a reference environmental temperature when obtaining the Expression (2).

The change rates At and Bt can be subjected to quadratic approximation based on the environmental temperature Tx and the temperature characteristics Aa, Ab, Ac, Ba, Bb, and Bc of the magnetic head 10 when obtaining the variation ΔH of the measurement value H from the initial state, similarly to the following Expressions (7) and (8).

$$At = Aa \times Tx^{\wedge}2 + Ab \times Tx + Ac \quad (7)$$

$$Bt = Ba \times Tx^{\wedge}2 + Bb \times Tx + Bc \quad (8)$$

As for the temperature characteristics Aa, Ab, Ac, Ba, Bb, and Bc, their representative values are measured before the process of manufacturing the magnetic head device 1, and the data of each of the measured representative values is stored in the characteristic table 23a in the flash ROM 23.

<Process of Controller 20>

Figure 17:
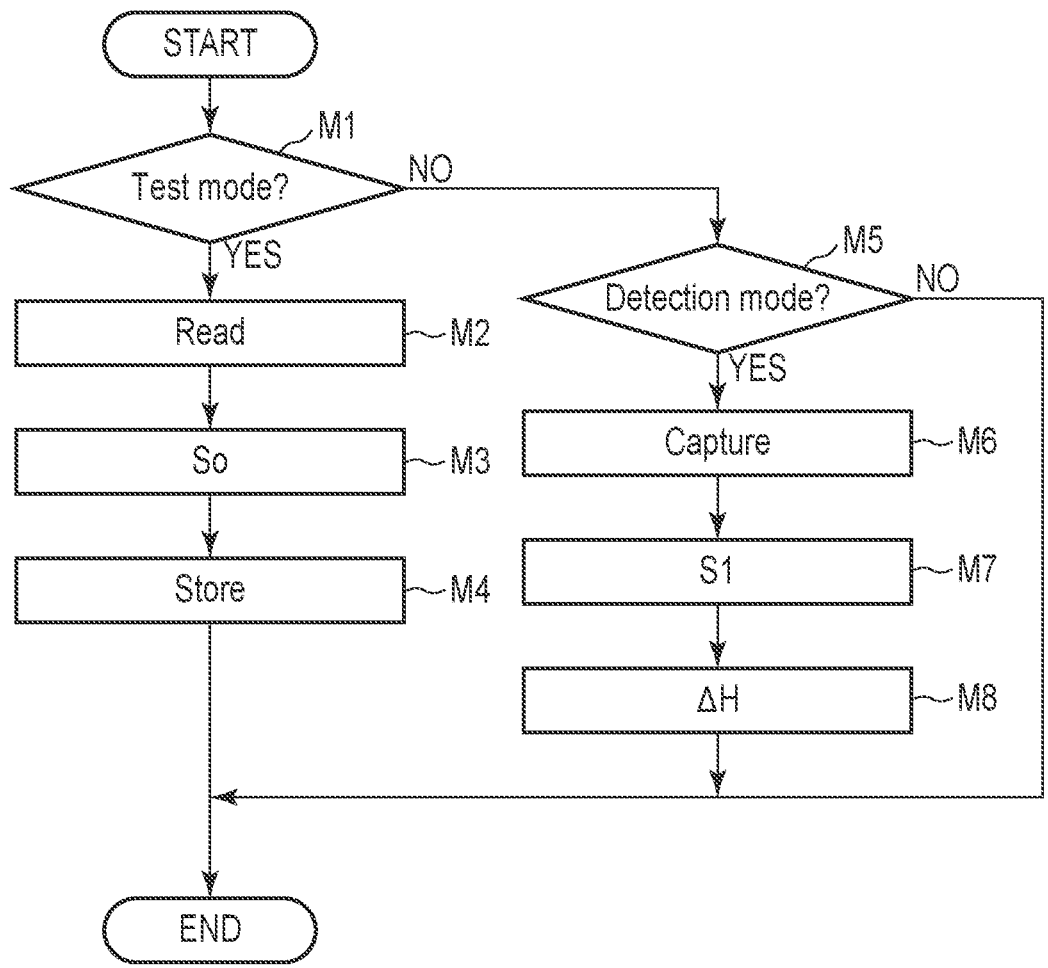
FIG. 17 is a flowchart showing processing of a controller in one embodiment.

The process executed by the controller 20 is shown in a flowchart of FIG. 17.

First, in the process of manufacturing the magnetic disk device 1, when the test mode is set by an engineer (YES in M1) immediately after the data Dw for measuring the flying height is written to the magnetic disk 2 (first time point), the controller 20 reads the data Dw for measuring the flying height by the magnetic head 10 while largely changing the heater power P from the reference value Po in a decreasing direction, similarly to the process shown in FIG. 9 (M2), monitors the first measurement value H of the harmonic sensor circuit 21c based on the read signal Dr, obtains a quadratic approximation of the monitored first measurement value H, and obtains a slope (first slope) So of the change of the first measurement value (quadratic approximation) H for the variation Px of the heater power P from the reference value Po (M3).

In accordance with this process, the controller 20 stores in the flash ROM 23 the data of the Expression (2) representing the first correspondence between the first measurement value (quadratic approximation) H and the variation Px of the heater power P from the reference value Po, the data of the Expression (3) representing the second correspondence between the slope So and the variation Px of the heater power P from the reference value Po, and the data of the third correspondence (FIG. 11) between the slope So and the measurement value (quadratic approximation) H (M4).

Next, at the stage when the manufactured magnetic disk device 1 is delivered to the user, when the detection mode is set by the engineer or user (NO in M1 or YES in M5) after a predetermined time (at the second time point) from the writing of the data Dw for measuring the flying height to the magnetic disk 2, the controller 20 sets the heater power P to the first predetermined value (reference value Po+variation Pa) and reads the data Dw for measuring the flying height by the magnetic head 10, captures the measurement value H of the harmonic sensor circuit 21c based on the read signal Dr as a first captured value Ha, sets the heater power P to the second predetermined value (reference value Po+variation Pb) and reads the data Dw for measuring the flying height by the magnetic head 10, and captures the measurement value H of the harmonic sensor circuit 21c based on the read signal Dr as a second captured value Hb (M6).

Next, the controller 20 then obtains a slope (second slope) S1 of the change in the measurement value H between the first captured value Ha and the second captured value Hb by the Expression (4) in the flash ROM 23 (M7). Then, the controller 20 detects the variation ΔH of the measurement value H of the harmonic sensor circuit 21c from the initial state by comparing the slope So in the third correspondence (FIG. 11) in the flash ROM 23 with the obtained slope S1 (M8).

More specifically, the controller 20 reads the measurement value H corresponding to the slope S1 from the data of the third correspondence by applying the slope S1 to the slope So of the third correspondence (FIG. 11) and referring to the third correspondence. Furthermore, the controller 20 obtains the variation Px corresponding to the slope S1 by applying the slope S1 to the slope So of the Expression (3) in the flash ROM 23 and executing the calculation of the Expression (3). Next, the controller 20 calculates the measurement value (quadratic approximation) H corresponding to the slope S1 by substituting the obtained variation Px for the Expression (2) in the flash ROM 23. Then, the controller 20 detects the difference between the calculated measurement value (quadratic approximation) H and the measurement value H read from the data of the third correspondence, as the variation ΔH of the measurement value H of the harmonic sensor circuit 21c from the initial state.

The detected variation ΔH does not include the "thermal fluctuation" or the deviations which result from the temperature characteristics of the preamplifier 22a, the read channel 21b, and the like, and the deviations which result from the temperature characteristics of the magnetic head 10 are also removed by the correction based on the correction data. Therefore, the variation ΔH of the measurement value H of the harmonic sensor circuit 21c from the initial state can be accurately detected without being affected by the "thermal fluctuation" or the temperature characteristics.

When the detected variation ΔH exceeds a permissible threshold value, the controller 20 reports this matter to the user or the engineer via the host computer 100. The work of adjusting the flying height H of the magnetic head 10 is performed by the user or the engineer receiving this report.

Verification of Advantages

FIG. 18 shows a measurement value Hoa of the flying height measurement unit monitored while changing the heater power P from the reference value Po in a decreasing direction at the first time point of being not yet affected by the "thermal fluctuation", in association with the variation Px of the heater power P, and also shows a measurement value Hob of the flying height measurement unit monitored while changing the heater power P in a decreasing direction from the reference value Po at the second time point (after the elapse of the first time point), which is already affected by the "thermal fluctuation", in association with the variation Px of the heater power P. In this example, the measurement value Hoa has no deviation which results from the "thermal fluctuation", while the measurement value Hob includes the deviation which results from the "thermal fluctuation".

In contrast, FIG. 19 shows a measurement value Hoa of the flying height measurement unit monitored while changing the heater power P from the reference value Po in a decreasing direction at the first time point of being not yet affected by the "thermal fluctuation", in association with the variation Px of the heater power P, and also shows a measurement value Hob of the flying height measurement unit monitored while changing the heater power P in a decreasing direction from the reference value Po' of the second time point, at the second time point, which is already affected by the "thermal fluctuation", in association with the variation Px of the heater power P. In this example, there is no difference between the slope So at the first time point and the slope S1 of the change at the second time point.

FIG. 20 shows a state in which the slopes S11 obtained for the plurality of magnetic heads 10 at the first time point of being not yet affected by the "thermal fluctuation", are distributed for the respective magnetic heads 10, and a state in which the slopes S12 obtained for the plurality of magnetic heads at the second time point of having already been affected by the "thermal fluctuation", are distributed for the respective magnetic heads. In this example, each slope S11 and each slope S12 converge at approximately the same value as each other regardless of the time elapsed since the writing of the data Dw for measuring the flying height.

FIG. 21 shows a state in which the variation ΔH detected by the controller 20 is distributed according to the individual characteristics of the magnetic head 10. FIG. 22 shows a state in which the variation ΔH detected by a conventional method largely is distributed according to the individual characteristics of the magnetic head 10.

Figure 24:
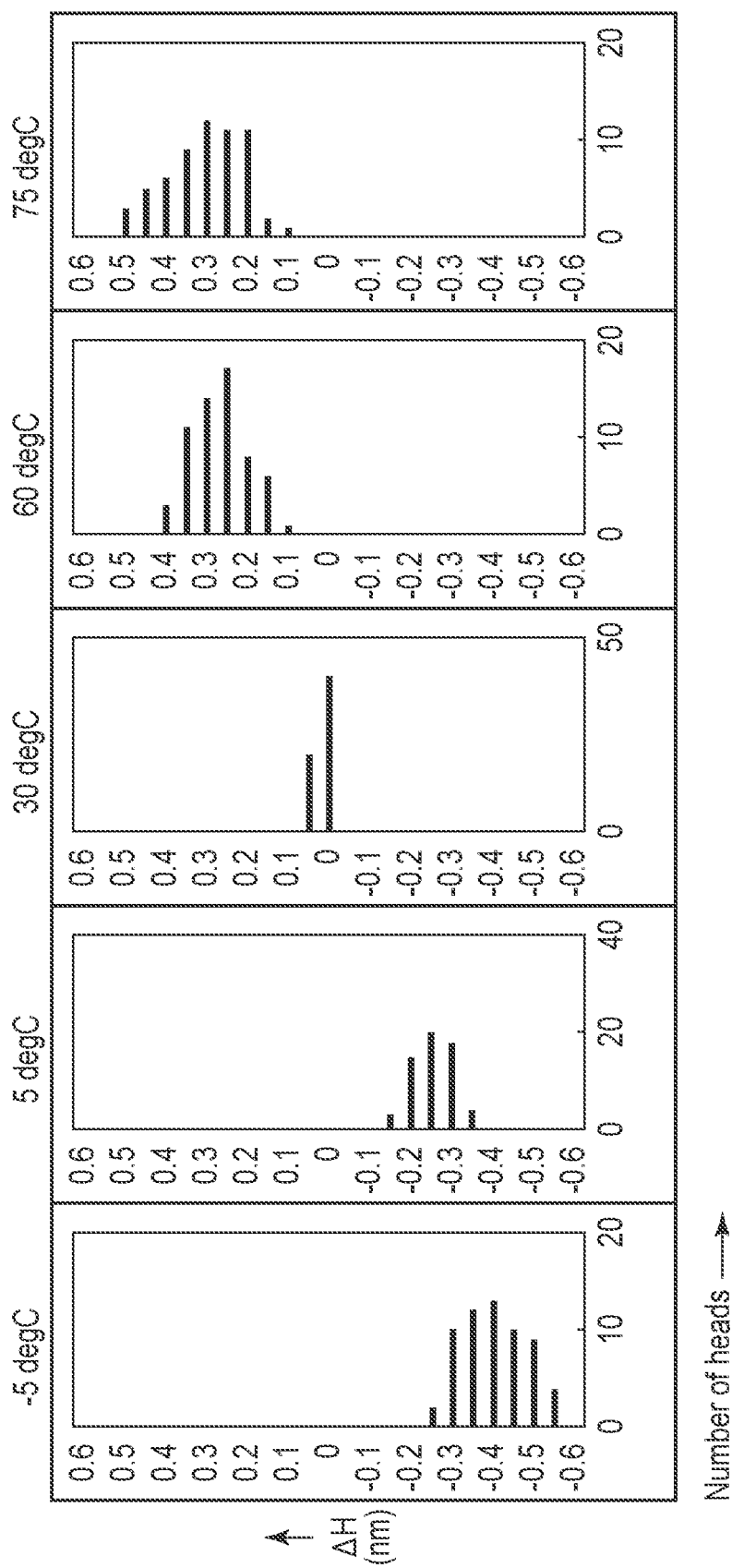
FIG. 24 is a graph showing a state in which the variation ΔH detected by a conventional method is distributed according to the temperature characteristics of the magnetic head and the environmental temperature Tx.

FIG. 23 shows a state in which the variation ΔH detected in one embodiment is distributed according to the temperature characteristics of the magnetic head and the environmental temperature Tx (=−5, 5, 30, 60, and 75 [degC]). FIG. 24 shows a state in which the variation ΔH detected by the conventional method is distributed according to the temperature characteristics of the magnetic head and the environmental temperature Tx (=−5, 5, 30, 60, and 75 [degC]).

MODIFIED EXAMPLE

The temperature characteristics of the magnetic head 10 are stored in the characteristics table 23a, in the above-described embodiment, but the seek position characteristics of the magnetic head 10 in the radial direction of the magnetic disk 2 may be stored in the characteristics table 23a in addition to the temperature characteristics. In this case, the controller 20 uses the temperature characteristics and the seek position characteristics as the correction data for detecting the slope S1 and the variation ΔH.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic head performing data write to and data read from a magnetic disk, including a heater generating heat with supplied power, and expanding to the magnetic disk side with the generated heat of the heater;
a flying height measurement unit measuring a flying height of the magnetic head, based on a read signal of the magnetic head for data for measuring flying height written to the magnetic disk; and
a controller controlling the supply power to the heater; wherein
the controller detects variation of a measurement value of the flying height measurement unit, based on change of "correspondence between a change amount of the supply power and a measurement value of the flying height measurement unit";
at a first time point, the controller reads the data for measuring the flying height with the magnetic head while changing the supply power in a decreasing direction from a reference value, monitors a first measurement value of the flying height measurement unit based on the read signal, obtains a first slope of change of the first measurement value for the change amount of the supply power by performing one differential operation off a quadratic approximation of the first measurement value, and obtains a "third correspondence between the first slope and the first measurement value" based on "a first correspondence between the change amount of the supply power and the first measurement value" and "a second correspondence between the change amount of the supply power and the first slope",
at a second time point, the controller reads the data for measuring the flying height with the magnetic head by setting the supply power to a first predetermined value, captures the measurement value of the flying height measurement unit based on the read signal as a first capture value, reads the data for measuring the flying height with the magnetic head by setting the supply power to a second predetermined value lower than the first predetermined value, captures the measurement value of the flying height measurement unit based on the read signal as a second capture value, and obtains a second slope of change between the first and second capture values of the measurement value of the flying height measurement unit for a change amount between the first and second predetermined values of the supply power, and
the controller detects deviation between the first slope and the second slope as the variation of the measurement value of the flying height measurement unit.

2. A device according to claim 1, wherein
the first time point is a time to set a test mode immediately after writing the data for measuring the flying height to the magnetic disk, and
the second time point is a time to set a detection mode after a predetermined time after writing the data for measuring the flying height to the magnetic disk.

3. A device according to claim 1, wherein
the flying height measurement unit extracts a first-order harmonic component and a third-order harmonic component from the read signal of the magnetic head for the data for measuring the flying height, and measures a flying height of the magnetic head by triple harmonic method (THM) processing based on a ratio of an amplitude value of the first-order harmonic component to an amplitude value of the third-order harmonic component.

4. A device according to claim 1, wherein
when detecting the variation at the second time point, the controller adds correction based on temperature characteristics of the magnetic head.

5. A method of detecting a flying height of a magnetic head in a magnetic disk device, the device comprising:
a magnetic head performing data write to and data read from a magnetic disk, including a heater generating heat with supplied power, and expanding to the magnetic disk side with the generated heat of the heater;
a flying height measurement unit measuring a flying height of the magnetic head, based on a read signal of the magnetic head for data for measuring flying height written to the magnetic disk; and
a controller controlling the supply power to the heater;
the method comprising:
detecting variation of a measurement value of the flying height measurement unit based on change of "correspondence between a change amount of the supply power and a measurement value of the flying height measurement unit";
wherein
at a first time point, reading the data for measuring the flying height with the magnetic head while changing the supply power in a decreasing direction from a reference value, monitoring a first measurement value of the flying height measurement unit based on the read signal, obtaining a first slope of change of the first measurement value for the change amount of the supply power by performing one differential operation of a quadratic approximation of the first measurement value, and obtaining a "third correspondence between the first slope and the first measurement value" based on "a first correspondence between the change amount of the supply power and the first measurement value" and "a second correspondence between the change amount of the supply power and the first slope",
at a second time point, reading the data for measuring the flying height with the magnetic head by setting the supply power to a first predetermined value, capturing the measurement value of the flying height measurement unit based on the read signal as a first capture value, reading the data for measuring the flying height with the magnetic head by setting the supply power to a second predetermined value lower than the first predetermined value, capturing the measurement value of the flying height measurement unit based on the read signal as a second capture value, and obtaining a second slope of change between the first and second capture values of the measurement value of the flying height measurement unit for a change amount between the first and second predetermined values of the supply power, and
detecting deviation between the first slope and the second slope as the variation of the measurement value of the flying height measurement unit.

6. A method according to claim 5, wherein at the second time point, reading a measurement value corresponding to the second slope from the second correspondence by applying the second slope to the first slope of the second correspondence and referring to the second correspondence, obtaining a change amount of the supply power corresponding to the second slope by applying the second slope to the first slope of an expression expressing the second correspondence and executing calculation of the expression, capturing a measurement value corresponding to the second slope by substituting the obtained change amount into an expression expressing the first correspondence, and detecting a difference between the calculated measurement value and a measurement value read from data of the third correspondence as a variation of the measurement value of the flying height measurement unit from an initial state.

7. A method according to claim 5, wherein the first time point is a time to set a test mode immediately after writing the data for measuring the flying height to the magnetic disk, and the second time point is a time to set a detection mode after a predetermined time after writing the data for measuring the flying height to the magnetic disk.

8. A method according to claim 5, wherein the flying height measurement unit extracts a first-order harmonic component and a third-order harmonic component from the read signal of the magnetic head for the data for measuring the flying height, and measures a flying height of the magnetic head by triple harmonic method (THM) processing based on a ratio of an amplitude value of the first-order harmonic component to an amplitude value of the third-order harmonic component.

9. A method according to claim 5, wherein when detecting the variation at the second time point, adding correction based on temperature characteristics of the magnetic head.

* * * * *